United States Patent [19]
Johnston

[11] 3,989,807
[45] Nov. 2, 1976

[54] LOW TEMPERATURE CATALYTIC OXIDATION OF CHLORINATED COMPOUNDS TO RECOVER CHLORINE VALUES USING CHROMIUM-IMPREGNATED SUPPORTED CATALYSTS

[75] Inventor: Earnest L. Johnston, Clearwater, Kans.

[73] Assignee: Vulcan Materials Company, Birmingham, Ala.

[22] Filed: Feb. 10, 1975

[21] Appl. No.: 548,776

[52] U.S. Cl. ............................. 423/502; 423/481; 423/488; 423/437
[51] Int. Cl.$^2$ .......................................... C01B 7/02
[58] Field of Search ........... 423/481, 488, 502, 462, 423/607, 437

[56] References Cited
UNITED STATES PATENTS

| | | | |
|---|---|---|---|
| 2,395,314 | 2/1946 | Blumer | 423/502 |
| 3,453,073 | 7/1969 | Sims | 423/481 |
| 3,486,913 | 12/1969 | Zirngibl, et al. | 423/607 X |
| 3,705,010 | 12/1972 | Davis, et al. | 423/502 |

OTHER PUBLICATIONS

J. W. Mellor's "A Comp. Treatise on Inorganic and Theoretical Chem.," vol. 2, 1922 Ed., pp. 66 and 67, Longmans, Green & Co., N.Y.

*Primary Examiner*—Edward Stern
*Attorney, Agent, or Firm*—Burns, Doane, Swecker & Mathis

[57] ABSTRACT

Substantially all of the chlorine values, e.g., chlorine, are recovered from reactant feeds of chlorinated organic compounds, e.g., hexachlorobenzene and hexachlorobutadiene, by an improved process involving catalytic oxidation at temperatures below 500° C and more typically below about 450° C using a catalyst of a chromium salt or oxide impregnated on a support.

16 Claims, No Drawings

3,989,807

LOW TEMPERATURE CATALYTIC OXIDATION OF CHLORINATED COMPOUNDS TO RECOVER CHLORINE VALUES USING CHROMIUM-IMPREGNATED SUPPORTED CATALYSTS

CROSS-REFERENCE TO RELATED APPLICATION

This is an improvement in processes set forth in co-pending application Ser. No. 548,769, filed on even date herewith in the name of David E. Hyatt and assigned to the assignee of the present invention.

BACKGROUND OF THE INVENTION

1. Field of the Invention

This invention relates to improved processes for the oxidation of chlorinated organic compounds to recover chlorine values.

2. Summary of the Prior Art

Producers of highly useful chlorinated organic compounds such as perchloroethylene, carbon tetrachloride, chloroprene, and vinyl chloride are faced with serious disposal problems with respect to the undesirable chlorinated organic by-products that are formed in the reactions. Processes employing chlorine-containing compounds as intermediates, such as making propylene oxide by the chlorohydrin route, also produce unwanted by-products. By-products which may be formed singularly or in various combinations include materials such as hexachloroethane, hexachlorobutadiene, hexachlorobenzene, and various $C_3$ and $C_4$ chlorinated organic compound mixtures. A typical disposal method for the undesirable chlorinated aromatic by-products currently consists primarily of terrestrial burial. Also used are ocean discharge, open pit burning, drum burial, and deep-well disposal. These methods, however, have engendered serious criticism as being dangerous to the environment. In addition, these methods may be economically unattractive because the cost of the undesirable chlorinated by-products being disposed is not diminished at least in part by recovery of some material of significant economic worth. Incineration of the undesirable chlorinated by-products by means of high performance burners or furnaces has also been proposed. Such proposal is disclosed, for example, in an article in *Chemical Week*, Apr. 19, 1972, pages 37 and 38, and French Pat. No. 1,326,053. Also, British Pat. No. 1,002,088 discloses a process for recovering the chlorine from chlorocarbon residues, such as produced in the above-mentioned processes, by burning these residues at an elevated temperature with oxygen or free oxygen containing gases. This process, however, requires the utilization of temperatures between about 700° and 1300° C. These high temperatures require special equipment that is stable at such temperatures and will resist corrosion by the chlorine, HCl and water produced, thus increasing capital expenditures and maintenance costs. Similarly, U.S. Pat. No. 3,548,016 discloses an involved multistep process for recovering chlorine values from certain chlorinated hydrocarbons by first burning, then reacting the combustion effluent with a salt mixture of cuprous chloride and copper oxychloride, and then reacting the resulting salt mixture with chlorinated hydrocarbon.

OBJECTS AND SUMMARY OF THE INVENTION

Accordingly, a primary object of the present invention is to provide a process for the recovery of chlorine values from chlorinated organic compounds which process substantially alleviates the above-discussed disadvantages of the prior art, or does not incur them altogether.

A more particular object of the present invention is to provide novel processes for the recovery of substantially all of the chlorine values from chlorinated organic compounds, which processes can be performed at relatively low temperatures.

Another object of the present invention is to provide a relatively low temperature process for the recovery of chlorine from chlorocarbons, which process does not involve the intermediate conversion of these chlorocarbons to hydrochloric acid.

A further object of the present invention is to provide a low temperature process for the recovery of chlorine from waste chlorocarbon residues.

In accordance with one aspect of the present invention, a novel process for the recovery or production of chlorine values from chlorinated organic compounds is provided, which process comprises catalytically oxidizing a chlorinated organic compound feed consisting essentially of chlorinated organic compounds by reacting the chlorinated organic feed with oxygen or an oxygen-containing gas at a reaction temperature of below 500° C and in the presence of at least one supported catalyst comprising a chromium salt or oxide impregnated on the support for a time sufficient to recover substantially all of the chlorine values from the chlorinated organic compound feed.

In another more particular aspect of the present invention, an improved catalytic oxidation process for the recovery of chlorine from a chlorocarbon feed mixture is provided, which process comprises forming a chlorocarbon feed mixture consisting essentially of hexachlorobenzene, hexachlorobutadiene and hexachloroethane, passing the chlorocarbon feed mixture and more than a stoichiometric amount of oxygen relative to the chlorocarbons into a reaction zone containing a fluidized bed consisting essentially of at least one supported catalyst in particulate fluidizable form, the supported catalyst consisting essentially of a catalytic amount of chromium chloride or chromium oxide impregnated on an active alumina carrier having a surface area of at least about 50 m²/gm, and maintaining a superficial linear velocity of the chlorocarbons and oxygen fed into the reaction zone above minimum fluidization velocity for the bed and a reaction zone temperature between about 300° C and about 450° C and a reaction zone pressure between about 0.5 atm (absolute) and about 10 atm (absolute), for a superficial reaction zone residence time of between about 2 seconds and 2 minutes and sufficient to oxidize essentially all of the chlorocarbon feed mixture to chlorine and carbon dioxide reaction products.

A central feature of the present invention is the surprising discovery that chromium-impregnated supported catalysts have improved stability and activity in an oxidation process wherein substantially all of the chlorine values can be directly recovered at relatively low temperatures, i.e., below 500° C and more typically below about 450° C, from a chlorinated organic compound feed, such as a chlorocarbon feed consisting essentially of hexachlorobenzene, hexachlorobutadiene and hexachloroethane. In such processes, the chromium-impregnated supported catalysts of the present invention have been found superior to other catalysts such as copper-impregnated supported catalysts or copper-exchanged or chromium-exchanged zeolitic catalysts.

In the past, as indicated above, chlorinated organic material by-products have been buried on land or at sea, or have been incinerated or burned at high temperatures. The low reactivities of these chlorinated materials were thought to require, in general, strenuous reaction conditions (i.e., high temperatures). to convert these materials to more useful products. Also, catalyst volatilization losses may have also in the past been thought by workers in this field to be deterrents to a useful catalytic process utilizing transition metals impregnated on a support.

These and other objects, aspects and advantages of the present invention will become more fully apparent to one skilled in the art from the following description of the preferred embodiments.

DESCRIPTION OF THE PREFERRED EMBODIMENTS

The chlorinated organic compounds which are reacted with oxygen or oxidized to recover or produce useful chlorine values in the process of the present invention may be divided into two classes.

The first class, chlorocarbons or mixtures thereof, are defined herein as compounds or mixtures containing only carbon and chlorine, or only carbon, chlorine and oxygen. Such compounds include, for example, hexachlorobenzene, hexachlorobutadiene, and hexachloroethane. Mixtures of such chlorocarbons, commonly called "hex pot bottoms" are unwanted by-products recovered as residual heavy still bottom materials from high temperature perchlorination reactions such as the thermal chlorination of propane, propylene, ethylene dichloride, propylene dichloride, and the like, to make perchloroethylene and carbon tetrachloride. Such a chlorocarbon stream is a most preferred starting material for the present invention although the process of the present invention is suitable for production of chlorine by the reaction of other chlorocarbons, regardless of their source. For example, such other chlorocarbons may include aliphatic and aromatic chlorocarbons of from 1 to about 20 carbon atoms, and more typically from 2 to 12 carbon atoms, per chlorocarbon molecule. Non-limiting examples of such other chlorocarbons include carbon tetrachloride, perchloroethylene, hexachlorocyclopentadiene, octachlorocyclopentene, octachlorostyrene, octachlorodibenzodioxin and decachlorobiphenyl.

The second class, chlorinated hydrocarbons or mixtures thereof, are defined herein as compounds or mixtures containing only carbon, chlorine and hydrogen, or only carbon, chlorine hydrogen and oxygen. Such chlorinated hydrocarbons may be lower molecular weight materials, e.g., may contain from 1 to about 30 carbon atoms, and more typically from 2 to 8 carbon atoms, or such chlorinated hydrocarbons may be of higher molecular weight, i.e., clorine-containing polymers or resins having a molecular weight of from about 5,000 to about 1 million. Nonlimiting examples of such chlorinated hydrocarbons include the various geometric isomers of benzene hexachloride, tetrachlorobutenes, trichloropropenes, waste materials from cracking of ethylene dichloride to vinyl chloride, dichloroethylene, trichloroethylene, trichloroethane, pentachlorobutane, hexachlorodibenzodioxin, tetrachlorobiphenyl, polyvinyl chloride and chlorinated polyethylene.

The above-described chlorinated organic compounds may be reacted in any convenient physical form. For example, the chlorinated organic compounds may be vaporized and mixed with oxygen or an oxygen-containing gas in the reaction zone or prior thereto. Chlorinated organic compounds which are not easily vaporizable, e.g., the above-described "hex pot bottoms" may be introduced into the reaction zone as a liquid in the form of, for example, droplets, mists or atomized jet. If necessary, chlorinated organic compounds which are normally solid at reaction temperatures or which sublime upon heating (such as hexachlorobenzene) may be dissolved in a liquid chlorocarbon prior to introduction into the reaction zone or may be introduced into the reaction zone as a slurry or as a solid.

The chlorinated organic compounds may be oxidized or reacted with oxygen or an oxygen containing gas at reaction temperatures of below 500° C, typically below about 450° C, and more typically between about 300° C and 425° C, for a time sufficient to recover substantially all, e.g., at least about 80 percent and preferably above 90 percent, of the chlorine values from the chlorinated organic compound feed. For example, the superficial reaction zone residence time may be from several seconds to several hours, more typically from several seconds up to several minutes, e.g., from about 2 seconds up to about 2 minutes, and preferably is from about 5 seconds up to about 100 seconds, and most preferably from about 5 seconds up to about 50 seconds.

Atmospheric, subatmospheric or superatmospheric reaction pressures may be employed. The reaction pressures typically may be from about 0.5 atm absolute to about 15 atm absolute, more typically from about 0.5 atm absolute to about 10 atm absolute, and preferably are from about 1 atm absolute to about 6 atm absolute.

Oxygen may be supplied for the reaction in the form of pure oxygen gas or as an oxygen-containing gas such as air. The ratio of total feed of oxygen to total feed of chlorinated organic starting material is a highly variable number which depends upon the specific composition of the feed and other process design factors. The oxidation reaction is typically conducted with an amount of oxygen that varies from about the stoichiometric amount required to oxidize completely the chlorinated organic compounds to chlorine values and carbon dioxide, plus any contained hydrogen to water, and typically is from about stoichiometric to 50% in excess of this amount. Preferably, the amount of oxygen varies from between the stoichiometric amount to 20% in excess of this amount.

As indicated above, the process of the present invention is conducted in the presence of at least one chromium-impregnated supported catalyst.

Non-limiting specific examples of chromium salts and oxides which may be impregnated on suitable supports include chromium chloride, e.g., chromium chloride and chromous chloride; chromium oxide, e.g., chromium dioxide, chromium trioxide and chromic oxide; chromium phosphate, e.g., chromic phosphate; chromium sulfate, e.g., chromic sulfate; chromium acetate, e.g., chromic acetate; chromium formate, e.g., chromic formate; chromium nitrate, e.g., chromic nitrate; chromium bromide, e.g., chromous bromide; chromium carbonate, e.g., chromous carbonate; chromic hydroxide; barium chromate, and potassium dichromate. Chromium chloride and chromium oxide are preferred, and chromic chloride is most preferred.

The above-described chromium salts and oxides are impregnated on a catalyst support or carrier for use in the present invention.

Non-limiting examples of supports or carriers suitable for impregnation and use may include alumina, silica-alumina, molybdena-alumina, activated alumina, silica gel, diatomaceous earths, Fuller's earth, kieselguhr, pumice, asbestos, kaolin, bentonite, zeolites (e.g., zeolites A, X and Y), silica-magnesia-alumina, and chromia-alumina.

Alumina supports, and particularly activated alumina supports are preferred.

Typically, these supports will have a surface area of at least 50 m$^2$/g, and preferably at least about 200 m$^2$/g.

The chromium salt or oxide may be impregnated on the support in any convenient manner. For example, the supported catalysts may be prepared by slurrying a quantity of the desired catalyst carrier in a solution or other liquid dispersion of the chromium salt or oxide, and then the liquid may be evaporated from the slurry. The resulting supported catalyst may be "conditioned" in order to form catalytically active coordinatively unsaturated chromium sites on the surface of the catalyst particles via dehydration in the presence of oxygen, e.g., air, at elevated temperatures, e.g., 350° C to 500° C.

These or any other suitable techniques known to those skilled in the art may be used.

The chromium salt or oxide may be impregnated on the support in any suitable amount as will be evident in view of the present specification to one skilled in this art. The supported catalyst may generally contain, for example, on a chromium metal calculated basis, from about 0.1 to about 20 percent, and preferably from about 0.5 to about 10 percent, chromium. Other co-catalysts, promoters or the like may also be present on the carrier if desired.

While the chromium-impregnated supported catalysts may be present in any shape, the process of the present invention is preferably performed utilizing a fluidized bed of catalyst in fluidizable form. For example, particulate fluidizable catalysts may vary from about 30 to about 400 mesh, more typically from about 100 to 400 mesh, and preferably from about 150 to 325 mesh (U.S. Standard Sieve Series).

Fixed catalyst beds may also be used, e.g., employing ¼ inch to 30 mesh particles.

When the catalyst is present in a fluidized or fixed bed, other inert particulate matter, e.g., Fuller's earth, pumice, and ceramic material may be mixed therewith.

The chlorine values, i.e., chlorine and any hydrogen chloride present, may be recovered from the reaction product stream by any suitable technique known to those skilled in the art. Thus, any hydrogen chloride may be absorbed in water, and the off gases containing chlorine and carbon dioxide may be dried, for example, by passage through a concentrated sulfuric acid drying tower, followed by absorption of the chlorine in a suitable solvent (e.g., carbon tetrachloride) followed by fractional distillation. Alternatively, the entire product stream may be used as a feed stream for another reaction, such as an oxychlorination reaction.

The present invention is additionally illustrated but not limited by the following examples; all parts, percentages and ratios indicated herein are by weight unless otherwise specified.

EXAMPLE I

Preparation of Catalysts

For this series of runs five chromium-impregnated supported catalysts (A, B, C, D, G) were prepared for use in accordance with the present invention, and two copper-impregnated supported catalysts (E, F), outside the scope of the present invention, were prepared for comparison purposes. Each of these supported catalysts were then used for atmospheric pressure catalytic oxidation of various chlorinated organic feeds.

The catalysts were prepared by slurrying a quantity of the desired catalyst carrier in a methanol or a methanol-water solution of the desired salt and evaporating the solvent from the slurry on a rotary evaporator with the aid of a heat gun. If lumps were formed, the catalyst was ground and screened through a 80-mesh sieve. The catalysts were then conditioned to remove water in the presence of air or oxygen at temperatures ranging from 350° C to 500° C. TABLE IA presents data on types and amounts of carriers and salts used.

TABLE IA

| Catalyst | Carrier | Carrier Surface Area, m$^2$/gm | Grams Carrier | Salt | Grams Salt |
|---|---|---|---|---|---|
| A | Activated Alumina | 300 | 700 | CrCl$_3$.6H$_2$O | 280 |
| B | Activated Alumina | 190 | 749 | CrCl$_3$.6H$_2$O | 280 |
| C | Activated Alumina | 250 | 640 | CrCl$_3$.6H$_2$O | 268.8 |
| D | Activated Silica Alumina | 525 | 640 | CrCl$_3$.6H$_2$O | 268.8 |
| E (comparison) | Zeolite | — | 500 | CuCl$_2$.2H$_2$O | 107 |
| F (comparison) | Activated Alumina | 190 | 454 | {CuCl$_2$.2H$_2$O<br>{K Cl | 131.5<br>68.9 |
| G | Zeolite | — | 500 | CrCl$_3$.6H$_2$O | 200 |

Oxidation Runs at Atmospheric Pressure

The oxidation reactions were run in a Pyrex glass fluidizable bed unit provided with a removable heating jacket. The reaction zone was 3 feet high and 1.34 inches in diameter and was topped by an expansion zone 8 inches long and 2.5 inches in diameter.

Air or oxygen was introduced to the reactor below a glass frit which served as a gas distributor and defined the bottom of the reaction zone. The chlorinated organic feeds, heated if necessary to liquify them in a kettle above the reactor, were admitted through a valve under autogenous pressure into a tube ending about 1 to 4 inches above the frit. The vaporized chlorine containing feeds entered in the reaction zone through a number of small holes at the bottom of the tube. Five hundred cubic centimeters of catalyst, sufficient to give a fluid bed of approximately 30 inches high, was charged to the reactor in each run. Other data and results appear in TABLE IB.

The reaction zone was provided with an electrically heated jacket containing "Dowtherm A", a mixture of diphenyl ether and biphenyl, the temperature of which was adjusted in order to regulate the temperature within the fluid bed.

For a typical run the reactor was charged with a

TABLE IB

Catalytic Oxidation of Chlorinated Organic Materials

| Run Series No. | 1 | 2 | 3 | 4C[d] | 5C[d] | 6 | 7 | 8 | 9 | 10 | 11 | 12C[d] |
|---|---|---|---|---|---|---|---|---|---|---|---|---|
| No. of Samples Averaged | 2 | 5 | 4 | 2 | 1 | 6 | 3 | 3 | 2 | 2 | 14 | 1 |
| Catalyst[a] | A | A | A | E | F | A | B | B | C | D | G | E |
| Feed Composition[b], % | 70 HCBD 20 HCB 10 HCE | Tet | 60 HCBD 40 Tet | HCBD | HCBD | 60 HCBD 40 Tet | 70 HCBD 20 HCB 10 HCE | Tet | 70 HCBD 20 HCB 10 HCE | HCBD | HCBD | HCBD |
| Oxidant | Air | Air | Air | Air | Air | $O_2$ | $O_2$ | $O_2$ | $O_2$ | $O_2$ | Air | Air |
| Excess $O_2$, % | 8.5 | 8.1 | 9.4 | 18.1 | 59.3 | 8.4 | 8.4 | 8.6 | 10.3 | 11.3 | 21.2 | 9.3 |
| Temperature, °C | 370 | 400 | 350 | 436 | 480 | 350 | 375 | 375 | 370 | 372 | 403 | 412 |
| Linear Velocity, ft/sec | 0.190 | 0.205 | 0.186 | 0.26 | 0.268 | 0.102 | 0.113 | 0.127 | 0.112 | 0.114 | 0.25 | 0.25 |
| Superficial Residence Time,[c] Secs. | 13.2 | 12.2 | 13.4 | 9.62 | 11.2 | 24.5 | 22.1 | 19.7 | 22.3 | 21.9 | 10.0 | 10.0 |
| Cl Recovery (Out as $Cl_2$ + HCl/In as RCl,% | 100 | 99.8 | 100 | 96.7 | 9.3 | 100 | 100 | 96.7 | 99.4 | 99.9 | 100.0 | ~92 |
| Selectivity to $Cl_2$,% | 100 | 67.3 | 85.5 | 100 | 100 | 82.3 | 99.4 | 62.8 | 100 | 100 | 100.0 | 100.0 |
| Selectivity to HCl, % | 0.0 | 32.7 | 14.5 | 0.0 | 0.0 | 16.7 | 0.6 | 31.2 | 0.0 | 0.0 | 0.0 | 0.0 |
| Theo. max. selec. to HCl, % | 0.0 | 50.0 | 20.4 | 0.0 | 0.0 | 20.4 | 0.0 | 50.0 | 0.0 | 0.0 | 0.0 | 0.0 |

[a]See TABLE IA
[b]HCBD = Hexachlorobutadiene-1,3; HCB = Hexachlorobenzene; HCE = Hexachloroethane; Tet = 1,1,2,2-Tetrachloroethane
[c]Superficial residence time is based on an effective bed height of 2.5 ft.
[d]Runs outside scope of present invention.

As may be seen from TABLE IB, run series 11 utilizing the chromium-impregnated support catalyst in accordance with the present invention was superior (lower temperatures with higher chlorine recovery) to the run (12C) using copper-impregnated supported catalyst.

EXAMPLE II

Catalyst Preparation

A 4,000 gram quantity of the catalyst carrier, a finely divided microspheriodal activated alumina with a surface area of approximately 190 m²/gm, was distributed over a large mixing table, and an aqueous solution containing 1,040 grams of chromium chloride hexahydrate in a total volume of 1,400 milliliters of solution was sprinkled over the distributed carrier as evenly as possible in portions followed by thorough manual mixing each time until all of the solution was absorbed into the solid carrier. The mixture was dried under heat lamps with frequent stirring and mixing to break up lumps, and finally dried in an oven at 220° C for about 2 to 4 hours. The calculated catalyst composition contained 4.39 weight percent combined chromium calculated as the metal, the percent weight based on the total weight of the chromium salt and the carrier.

Oxidation Runs at Elevated Pressure

In elevated pressure runs a fluidized bed reactor constructed of Inconel nickel-chromium alloy was employed. The reactor zone was 2 inches in diameter and 13 feet in height topped by an expansion zone 6 inches in diameter and 2 feet in height. The reactor was provided with a movable thermocouple within a central thermowell which extended from the top to within 3 inches of the bottom of the bed. The hexachlorobutadiene-1,3 chlorocarbon feed was mixed with air or oxygen at a tee 6 inches before the orifice into the reactor.

sufficient amount of the above-described catalyst to provide a fluidized bed height of approximately 6 to 9 feet. The bed was fluidized with air at atmospheric pressure and preheated to a temperature approximately 60°–100° C below the desired operating temperature. Feeds were then substituted for the air flow and the pressure adjusted to the desired value by means of a conventional back pressure regulator. Other data and results are shown in TABLE II.

TABLE II

Oxidation of HCBD at Elevated Pressure

| Run Series No. | 1 | 2 | 3 | 4 |
|---|---|---|---|---|
| No. of tests averaged | 7 | 5 | 6 | 4 |
| Oxidant | $O_2$ | $O_2$ | Air | Air |
| Excess $O_2$, % | 5.3 | 16.0 | 22.5 | 15.4 |
| Avg. temperature, C | 429 | 408 | 409 | 417 |
| Pressure, psia | 15.1 | 49 | 15 | 52 |
| Linear velocity, ft/sec | 0.38 | 0.17 | 0.63 | 0.71 |
| Superficial Residence Time,[a] seconds | 15.8 | 35.3 | 9.5 | 8.4 |
| Cl Recovery, Out/In, % | 99.9 | 99.6 | 101.6 | 99.4 |
| Selectivity to $Cl_2$, % | 100.0 | 100.0 | 100.0 | 100.0 |

[a]Superficial residence time is based on an effective bed height of 6 feet.

EXAMPLE III

A chromium trioxide impregnated support catalyst was prepared in accordance with the procedure of Example II (except chromium trioxide was substituted for chromium chloride hexahydrate) and an oxidation run was made in a manner similar to the runs of Example II except that the chromium trioxide impregnated catalyst was used. Data and results are shown in TABLE III.

TABLE III

Catalytic Oxidation of HCBD Using $CrO_3$ Supported Catalyst

| Run series no. | 1 |
|---|---|
| No. of samples averaged | 1 |

TABLE III-continued

Catalytic Oxidation of HCBD Using $CrO_3$ Supported Catalyst

| Catalyst[a] | |
|---|---|
| Salt | $CrO_3$ |
| Support | Activated alumina |
| Feed composition,[b]% | HCBD |
| Oxidant | $O_2$ |
| Excess $O_2$, % | 10.4 |
| Temperature | 364° C |
| Linear velocity, ft/sec | 0.164 |
| Superficial residence time,[c] sec | 15.2 |
| Cl recovery (out as $Cl_2$/in as RCl), % | 98.2 |

[a]The catalyst was prepared by impregnating 1300 grams of an activated alumina carrier, surface area of 190 $m^2$/gm, with an aqueous solution containing 87 grams of chromium trioxide.
[b]HCBD = hexachlorobutadiene-1,3
[c]Superficial residence time is based on an effective bed height of 2.5 feet The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. An improved catalytic oxidation process for the recovery of chlorine from chlorocarbons consisting of carbon and chlorine, which process consists essentially of catalytically oxidizing a feed consisting essentially of chlorocarbons with at least a stoichiometric amount of oxygen present in the process as molecular oxygen or molecular oxygen-containing gas at a reaction temperature of below 500° C in the presence of at least one supported catalyst selected from the group consisting of salts and oxides of chromium impregnated on a support for a time sufficient to recover substantially all of the chlorine from the chlorocarbon feed.

2. A process according to claim 1 wherein the catalyst support is alumina or zeolite.

3. A process according to claim 2 wherein the reaction temperature is between about 300° C and 450° C and a superficial reaction zone residence time of about 5 seconds to 100 seconds and a reaction zone pressure of from about 0.5 atm (absolute) to about 15 atm (absolute) are maintained.

4. An improved catalytic oxidation process for the recovery of chlorine from chlorocarbons, which process consists essentially of catalytically oxidizing a feed consisting essentially of chlorocarbons with at least a stoichiometric amount of oxygen present in the process as molecular oxygen or molecular oxygen-containing gas at a reaction temperature of below 500° C in the presence of at least one supported catalyst selected from the group consisting of salts and oxides of chromium impregnated on a support for a time sufficient to recover substantially all of the chlorine from the chlorocarbon feed, wherein the feed consists essentially of hexachlorobenzene, hexachlorobutadiene and hexachloroethane and wherein the supported catalyst is chromium chloride or chromium oxide impregnated on a support having a surface area of at least about 50 $m^2$/g.

5. An improved catalytic oxidation process for the recovery of chlorine from chlorocarbons consisting of carbon and chlorine, which process consists essentially of catalytically oxidizing a feed consisting essentially of chlorocarbons by reacting the feed with at least a stoichiometric amount of oxygen present in the process as molecular oxygen or molecular oxygen-containing gas at a reaction temperature of between about 300° C and about 450° C, in the presence of at least one supported catalyst comprising a catalytic amount of chromium chloride or chromium oxide impregnated on an alumina support, for a time sufficient to recover substantially all of the chlorine from the chlorocarbon feed.

6. A process according to claim 5 wherein the chlorocarbons are from 1 to 20 carbon atoms and the catalyst support is activated alumina having a surface area of at least about 50 $m^2$/g.

7. An improved catalytic oxidation process for the recovery of chlorine from chlorocarbons, which process consists essentially of catalytically oxidizing a feed consisting essentially of chlorocarbons by reacting the feed with at least a stoichiometric amount of oxygen present in the process as molecular oxygen or molecular oxygencontaining gas at a reaction temperature of between about 300° C and about 450° C, in the presence of at least one supported catalyst comprising a catalytic amount of chromium chloride or chromium oxide impregnated on an alumina support, for a time sufficient to recover substantially all of the chlorine from the chlorocarbon feed, wherein the chlorocarbons are from 1 to 20 carbon atoms and the catalyst support is activated alumina having a surface area of at least about 50 $m^2$/g and wherein the feed consists essentially of hexachlorobenzene, hexachlorobutadiene and hexachloroethane.

8. A process according to claim 7 wherein the reaction temperature is between about 300° C and 450° C and a superficial reaction zone residence time of about 5 seconds to 50 seconds is maintained.

9. An improved catalytic oxidation process for the recovery of chlorine from a chlorocarbon feed, which process consists essentially of:
forming a chlorocarbon feed consisting of chlorocarbons consisting of chlorine and from 1 to 20 carbon atoms; and
catalytically oxidizing the feed by reacting the feed with at least a stoichiometric amount of oxygen present in the process as molecular oxygen or molecular oxygen-containing gas at a reaction temperature of below about 450° C, in the presence of at least one supported catalyst comprising a catalytic amount of chromium chloride or chromium oxide impregnated on an alumina support, for a time sufficient to oxidize substantially all of the chlorocarbon feed to chlorine and carbon dioxide reaction products.

10. A process according to claim 9 wherein the reaction temperature is between about 300° C and 450° C and a superficial reaction zone residence time of about 5 seconds to 50 seconds is maintained.

11. A catalytic oxidation process for the recovery of chlorine from a chlorocarbon feed mixture, which process comprises
forming a chlorocarbon feed mixture consisting essentially of hexachlorobenzene, hexachlorobutadiene and hexachloroethane,
passing the chlorocarbon feed mixture and more than a stoichiometric amount of oxygen relative to the chlorocarbons into a reaction zone containing a fluidized bed consisting essentially of a supported catalyst in particulate fluidizable form, the supported catalyst consisting essentially of a catalytic amount of chromium chloride or chromium oxide impregnated on an activated alumina carrier having a surface area of at least about 50 m²/gm, and maintaining a superficial linear velocity of the chlorocarbons and oxygen fed into the reaction zone above minimum fluidization velocity for the bed and a reaction zone temperature below about 450° C and a reaction zone pressure between about 0.5 atm (absolute) and about 10 atm (absolute) for a superficial reaction zone residence time of between about 2 seconds and two minutes and sufficient to oxidize essentially all of the chlorocarbon feed mixture to chlorine and carbon dioxide reaction products.

12. A process according to claim 11 wherein the chromium chloride is chromic chloride.

13. A process according to claim 1 wherein the supported catalyst is chromium chloride impregnated on an alumina or zeolite support.

14. A process according to claim 5 wherein the supported catalyst is chromium chloride impregnated on an alumina or zeolite support.

15. A process according to claim 9 wherein the supported catalyst is chromium chloride impregnated on an alumina or zeolite support.

16. An improved catalytic oxidation process for the recovery of chlorine from a chlorocarbon feed consisting essentially of hexachlorobenzene, hexachlorobutadiene and hexachloroethane, which process comprises catalytically oxidizing the chlorocarbon feed with at least a stoichiometric amount of oxygen present in the process as molecular oxygen or molecular oxygen-containing gas at a reaction temperature of below 500° C and in the presence of at least one supported catalyst selected from the group consisting of salts and oxides of chromium impregnated on a support for a time sufficient to recover substantially all of the chlorine from the chlorocarbon feed.

* * * * *